US012190695B2

(12) United States Patent
McGrath et al.

(10) Patent No.: US 12,190,695 B2
(45) Date of Patent: Jan. 7, 2025

(54) METHODS AND APPARATUS FOR MONITORING VESSEL ACTIVITY

(71) Applicant: NAVCAST INC., Mississauga (CA)

(72) Inventors: William Patrick McGrath, Tavistock (CA); Peter Hunt, Oakville (CA); Ferenc Vereb, Etobicoke (CA)

(73) Assignee: Navcast Inc., Mississauga (CA)

( * ) Notice: Subject to any disclaimer, the term of this patent is extended or adjusted under 35 U.S.C. 154(b) by 920 days.

(21) Appl. No.: 17/258,139

(22) PCT Filed: Jun. 19, 2019

(86) PCT No.: PCT/CA2019/050860
§ 371 (c)(1),
(2) Date: Jan. 5, 2021

(87) PCT Pub. No.: WO2020/006625
PCT Pub. Date: Jan. 9, 2020

(65) Prior Publication Data
US 2021/0280032 A1    Sep. 9, 2021

Related U.S. Application Data

(60) Provisional application No. 62/694,873, filed on Jul. 6, 2018.

(51) Int. Cl.
G08B 17/04    (2006.01)
G08B 25/00    (2006.01)
G08B 29/04    (2006.01)

(52) U.S. Cl.
CPC ............. *G08B 17/04* (2013.01); *G08B 25/00* (2013.01); *G08B 29/046* (2013.01)

(58) Field of Classification Search
CPC ...... G08B 17/04; G08B 25/00; G08B 29/046; G01H 1/00; G01H 3/10; G06Q 50/02
See application file for complete search history.

(56) References Cited

U.S. PATENT DOCUMENTS 3,499,311 A * 3/1970 Lankford ............... G01L 23/00
73/35.16
4,305,142 A * 12/1981 Springer ................. G01S 5/22
367/906
(Continued)

FOREIGN PATENT DOCUMENTS

EP    3109659 A1    12/2016
EP    3236293 A1 * 10/2017
(Continued)

OTHER PUBLICATIONS

JP-2009017241-A; Hokura S, Highly Functional Buoy Incorporating GPS, Jan. 2009. (Year: 2009).*
(Continued)

*Primary Examiner* — John Fitzgerald
*Assistant Examiner* — Tania Courson
(74) *Attorney, Agent, or Firm* — Klarquist Sparkman, LLP

(57) ABSTRACT

Devices and methods are disclosed for monitoring at fishing vessels to detect blast fishing activity. A blast sensor is mountable to a vessel such that it produces a signal in response to pressure waves in water. A controller receives the signal and is operable to analyze the signal to detect blast events based on signal characteristics. A position measurement device measures a position of the vessel. A transmitter is provided to wirelessly transmit status information including a unique identifier of the monitoring unit and indicative of the position of the monitoring unit and to send a wireless alarm signal in response to a detected blast event.

29 Claims, 11 Drawing Sheets

(56) References Cited

U.S. PATENT DOCUMENTS

| | | | | |
|---|---|---|---|---|
| 5,099,456 | A * | 3/1992 | Wells | G01S 3/808 |
| | | | | 367/127 |
| 7,139,222 | B1 * | 11/2006 | Baxter | G01S 5/18 |
| | | | | 367/129 |
| 7,532,542 | B2 * | 5/2009 | Baxter | G01S 19/34 |
| | | | | 367/127 |
| 7,751,282 | B2 * | 7/2010 | Holmes | G01S 19/41 |
| | | | | 342/357.44 |
| 9,568,389 | B2 * | 2/2017 | Wong | G01L 23/00 |
| 9,721,456 | B2 * | 8/2017 | Thurlow | H04W 4/02 |
| 9,818,279 | B2 * | 11/2017 | Bernhardt | G08B 21/10 |
| 9,969,468 | B2 * | 5/2018 | Price, III | B63B 21/26 |
| 10,081,410 | B2 * | 9/2018 | Pyörre | G07C 5/008 |
| 11,589,286 | B2 * | 2/2023 | Liang | H04W 4/38 |
| 11,668,614 | B2 * | 6/2023 | Willens | G01L 19/147 |
| | | | | 73/756 |
| 2006/0280033 | A1 * | 12/2006 | Baxter | G01S 5/22 |
| | | | | 367/129 |
| 2009/0109796 | A1 * | 4/2009 | Holmes | G01S 5/22 |
| | | | | 367/128 |
| 2010/0302908 | A1 * | 12/2010 | Strong | G01C 13/002 |
| | | | | 367/90 |
| 2012/0086569 | A1 * | 4/2012 | Golden | G08B 15/00 |
| | | | | 340/521 |
| 2015/0143875 | A1 | 5/2015 | Wong et al. | |
| 2016/0027275 | A1 * | 1/2016 | Bernhardt | G08B 21/02 |
| | | | | 340/665 |
| 2016/0097756 | A1 * | 4/2016 | Borkholder | G01N 33/227 |
| | | | | 73/35.15 |
| 2017/0140637 | A1 * | 5/2017 | Thurlow | G08B 21/182 |
| 2017/0247086 | A1 | 8/2017 | Pyörre et al. | |
| 2017/0247089 | A1 | 8/2017 | Pyörre et al. | |
| 2022/0161910 | A1 * | 5/2022 | Kim | B63B 22/00 |
| 2022/0206167 | A1 * | 6/2022 | Dasgupta | G01S 19/49 |

FOREIGN PATENT DOCUMENTS

| | | |
|---|---|---|
| GB | 2399169 A | 9/2004 |
| WO | WO-2011056830 A1 * | 5/2011 |

OTHER PUBLICATIONS

EP-120520-A; Gustafson, "Locating Submerging Sound Source Using at Least 3 Hydrophone Listening Devices Transmitting Alternately Signals Representing Own Identity and Detected Sound", Oct. 1984. (Year: 1984).*

EP-0064477-A1; Loeliger, "Method And Assembly to Locate Detonations", Nov. 1982. (Year: 1982).*

NO-336401-B1; Guillot et al., "Underwater GPS Based Cable Positioning System", Aug. 2015. (Year: 2015).*

CN-103376467-A; Didier, "Method and System for Managing a Multi-vessel Seismic System", Oct. 2013 (Year: 2013).*

International Search Report and Written Opinion for International Application No. PCT/CA2019/050860, Canadian Searching Authority, mailed Aug. 26, 2019 (10 pages).

Showen et al., "Locating fish bomb blasts in real-time using a networked acoustic system," *Mar Pollut Bull.* 128: 496-507, Mar. 2018.

Woodman et al., "Acoustic characteristics of fish bombing: potential to develop an automated blast detector," *Mar Pollut Bull.* 46.1: 99-106, Jan. 2003.

Avendano et al., "Underwater Explosion Detection with SMS Prompt," *2017 IEEE 9th International Conference on Humanoid, Nanotechnology, Information Technology, Communication and Control, Environment and Management (HNICEM)*: 1-5, Dec. 1, 2017.

Bharadwaj et al., "A Methodology for Detection and Localization of Dynamite Fishing," *2015 Annual IEEE India Conference (INDICON)*: 1-6, Dec. 17, 2015.

Woodman et al., "A Direction-Sensitive Underwater Blast Detector and Its Application for Managing Blast Fishing," *Marine Pollution Bulletin* 49.11-12: 964-973, Dec. 2004.

* cited by examiner

METHODS AND APPARATUS FOR MONITORING VESSEL ACTIVITY

CROSS REFERENCE TO RELATED APPLICATIONS

This is the U.S. National Stage of International Application No. PCT/CA2019/050860, filed Jun. 19, 2019, which was published in English under PCT Article 21(2), which in turn claims the benefit of U.S. Provisional Application No. 62/694,873, filed Jul. 6, 2018. The provisional application is incorporated herein in its entirety.

FIELD

This relates to monitoring for marine vessels, and in particular, to monitoring blast events at fishing vessels.

BACKGROUND

Some areas are subjected to intensive fishing. Overfishing can be damaging to fish stocks and marine environments. Accordingly, fishing activities are typically regulated.

One type of fishing activity that can be particularly harmful is blast fishing. Blast fishing involves detonation of explosive devices in the water. The resulting explosive blast can kill large numbers of fish, with relatively low effort. However, blast fishing can be very damaging to marine environments.

Blast fishing is typically subject to regulatory prohibition. However, such prohibitions can be difficult to enforce. Blast fishing is often practiced from small, individually-owned vessels which tend to operate in large fleets in a common fishing area. Accordingly, it is difficult to detect the occurrence of blast fishing, and due to the size and number of vessels, it can also be difficult to identify individuals or vessels responsible.

SUMMARY

An example device for monitoring fishing vessel activity comprises: a blast sensor mountable to a vessel for providing a signal responsive to pressure waves in water; a position measurement device for measuring a position of the vessel; a controller operable to detect a blast event based on a characteristic of a signal from the blast sensor; and a transmitter to wirelessly transmit status information including a unique identifier of the monitoring unit and indicative of the position of the monitoring unit and to send a wireless alarm signal in response to a detected blast event.

A method of monitoring fishing vessel activity, comprising, at a vessel: from a sensor mounted to the vessel, producing a signal responsive to pressure waves in water; measuring a position of the vessel using a receiver for a satellite positioning system; processing the signal to detect a blast event based on a characteristic of the signal; wirelessly transmit status information to a monitoring station, the status information including a unique identifier of the monitoring unit and indicative of the position of the monitoring unit; and wirelessly transmit a wireless alarm signal to the monitoring station in response to a detected blast event.

DETAILED DESCRIPTION

Example apparatus and methods herein may aid in detection of blast fishing activities and identifying associated information, such as location of activities and individuals or vessels responsible for blast fishing.

In some embodiments, detection is by measurement of pressure waves created in water by detonation of explosives (hereinafter referred to as "blast event"). Detonation of an explosive in the water causes a shockwave or pressure pulse, which propagates through the water away from the site of the detonation. The initial pulse may be followed by a series of smaller pulses. Upon contacting an object in the water, the pressure pulse may cause small movements of the object. For example, a boat hull may vibrate slightly in response to the pressure pulse. Such vibrations may be periodic and may decay in magnitude. The characteristics of the vibrations may be impacted by the explosion, e.g. the size and strength of the initial pressure pulse and subsequent pulses, and by properties of the object—for a boat hull, the hull material, shape and construction. In some embodiments, monitoring devices comprising accelerometers are mounted to objects in the water to measure vibrations in order to identify blast events.

In some embodiments, a monitoring facility receives data from multiple monitoring devices located on multiple vessels, and provides analysis or reporting functions. For example, the monitoring facility may allow for tracking of vessels and identification of witness vessels near to a blast event. Such information may be provided to regulatory authorities.

Figure 1:
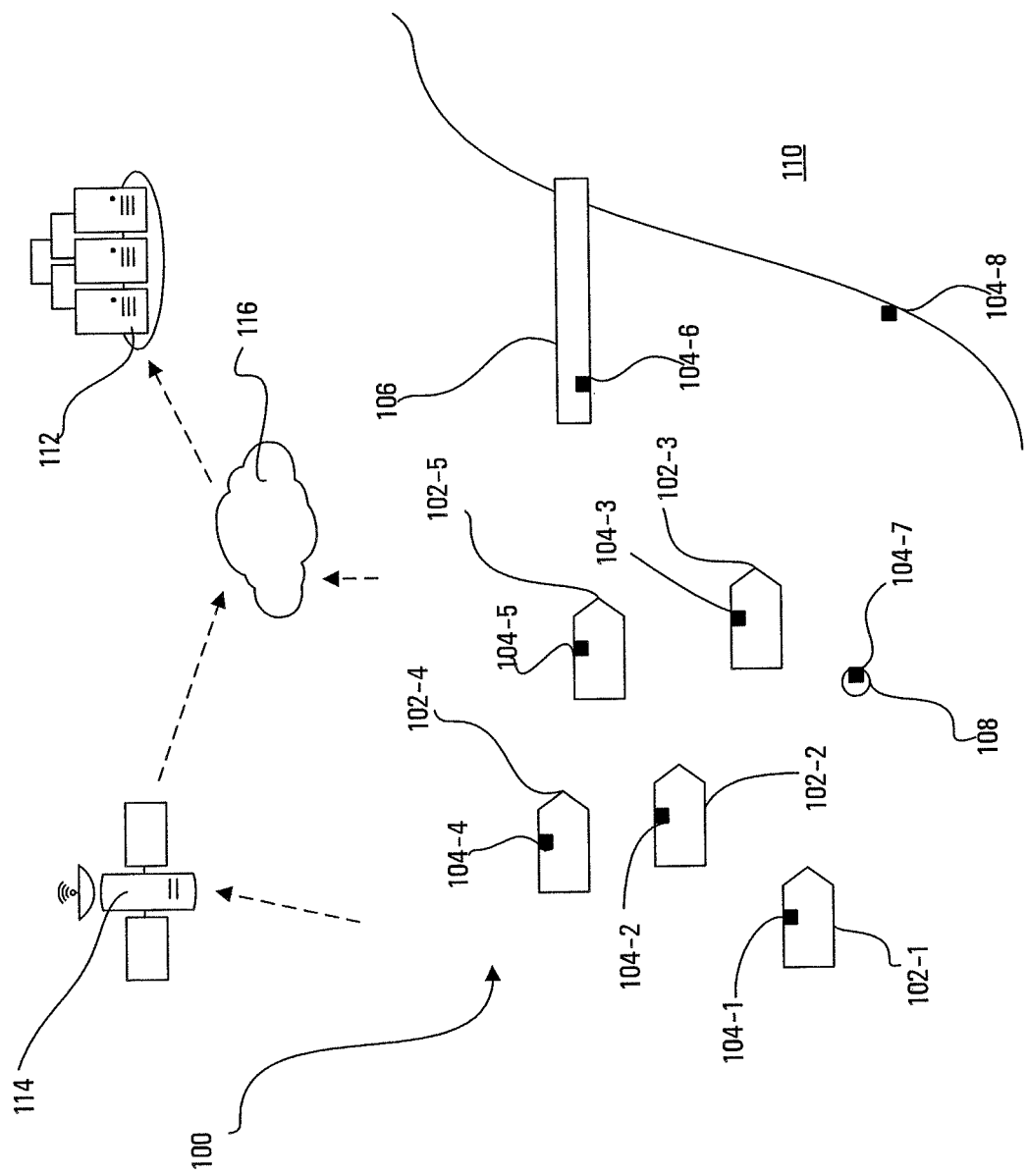
FIG. 1 is a schematic view of a vessel monitoring system.

FIG. 1 depicts an example vessel monitoring system 100. In the depicted example, vessel monitoring system 100 is for monitoring activity of fishing vessels 102. Five fishing vessels 102-1, 102-2, 102-3, 102-4, 102-5 are shown (collectively referred to as "vessels 102" or "a fleet"). However, any number of vessels may be present.

Monitoring system 100 includes a plurality of monitoring devices 104. Monitoring devices 104 are installed on each of vessels 102. Monitoring devices 104 may also be installed on stationary objects near fishing grounds. For example, as shown, monitoring devices 104 are installed on a dock or pier 106, on a buoy 108 and along a shoreline 110. In the depicted embodiment, eight monitoring devices are shown. Five monitoring devices 104-1, 104-2, 104-3, 104-4, 104-5 are installed to vessels 102. Monitoring device 104-6 is installed to dock 106, monitoring device 104-7 is installed to buoy 108 and monitoring device 104-8 is installed along shoreline 110.

As will be described in greater detail, monitoring devices 104 are configured to monitor conditions at or near vessels 102. Such conditions may be representative of activities such as fishing activities at the vessel. Thus, monitoring devices 104 are configured to detect and measure the effects of pressure pulses in the water to identify (flag) a likely occurrence of an explosive blast consistent with blast fishing. As used herein, detection of a blast event refers to detection of a signal likely to have been generated by a blast event.

A monitoring device 104 may include components for measuring the position of the monitoring device 104 and thus, the position of the vessel 102 or object to which the monitoring device 104 is mounted.

Monitoring devices 104 may transmit messages to a monitoring facility 112. The messages may contain data reflecting measurements at the monitoring device and the position of the monitoring device. Monitoring facility 112 includes one or more computing devices configured to receive communications from monitoring devices 104 and process data in such communications. For example, monitoring facility 112 may monitor measurements received from monitoring device 104 to flag suspected blast activity, and to identify vessels in proximity to such activity.

In some embodiments, system 100 may include a single, centralized monitoring facility 112. In other embodiments, system 100 may include multiple. monitoring facilities 112. For example, each of multiple monitoring facilities 112 may communicate with only a subset of monitoring devices 104. Additionally or alternatively, different monitoring facilities 112 may perform different types of processing. Some monitoring facilities 112 may be in communication with one another, e.g. to exchange monitoring data. Other monitoring facilities may be isolated from one another. For example, facilities 112 may be present in multiple jurisdictions and may be isolated from one another for compliance with regulations such as privacy regulations.

Monitoring devices 104 may communicate with monitoring facilities 112 by way of a communication network 116. Network 116 may comprise one or more local-area networks (LANs), wide-area networks (WANs), such as the internet, or private WANs. Such networks may use any one or more of wired or wireless connection technologies, such as IEEE 802.11 (Wi-Fi), cellular, WiMax, or the like. Optionally, monitoring devices 104 may form a mesh network, wherein messages are conveyed to or from monitoring facilities 112 by way of other monitoring devices 104.

In some embodiments, monitoring devices 104 may communicate with monitoring facilities 112 by way of one or more satellites 114.

Figure 2:
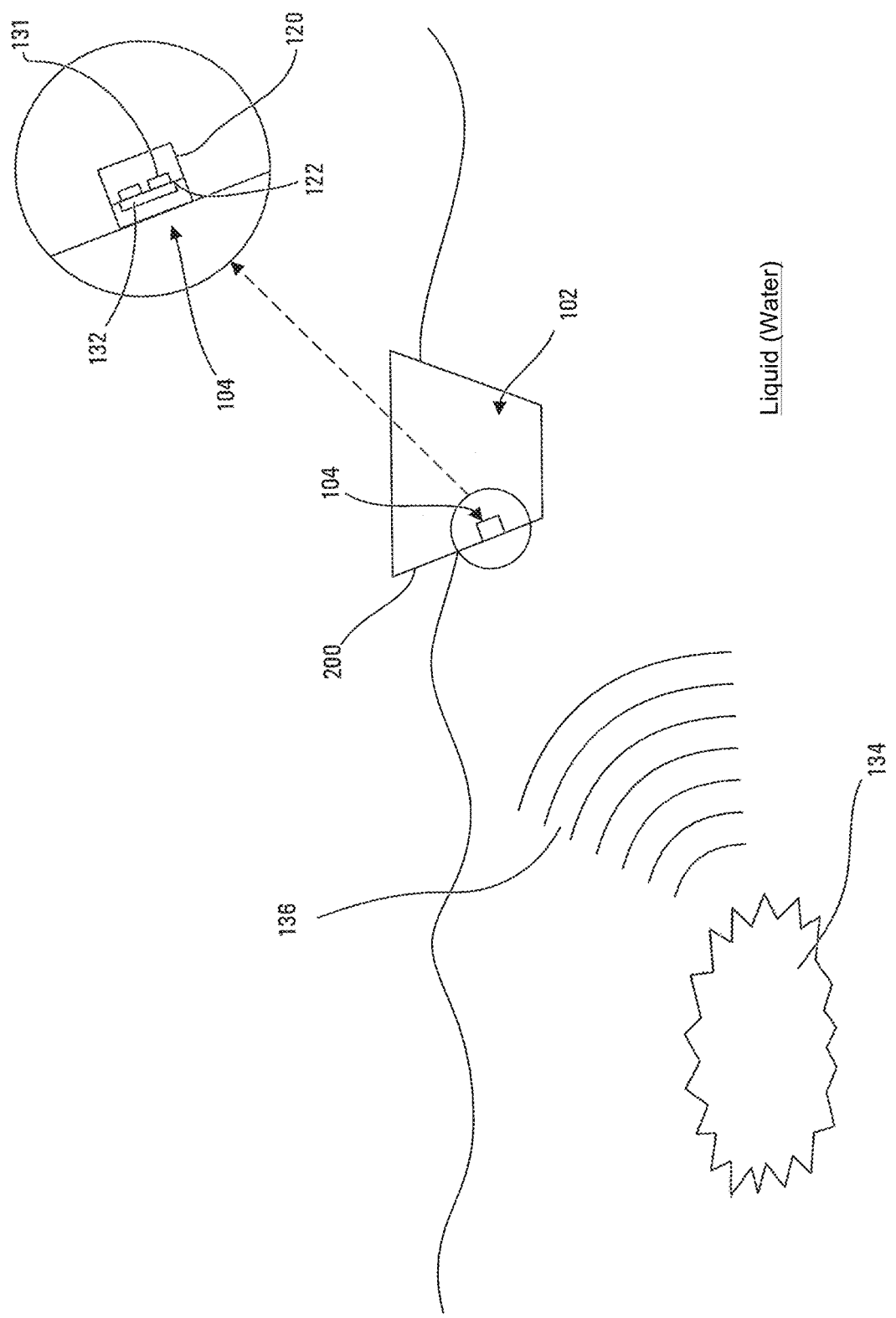
FIG. 2 is a schematic view showing mounting of a monitoring device on a vessel.

FIG. 2 depicts a vessel 102 with a monitoring device 104 in greater detail. As shown, vessel 102 has a hull 200. Monitoring device 104 is mounted to an inside surface of the hull 200.

Figure 4A:
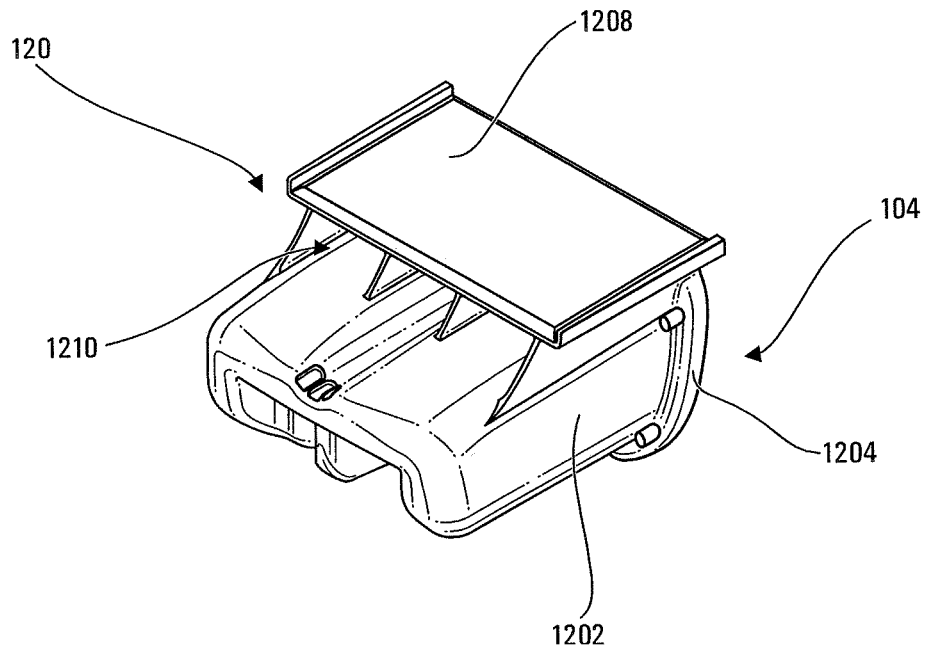
FIGS. 4A-4D are isometric and cross-section views showing a housing and internal components of the monitoring device of FIG. 2.
Figure 4B:
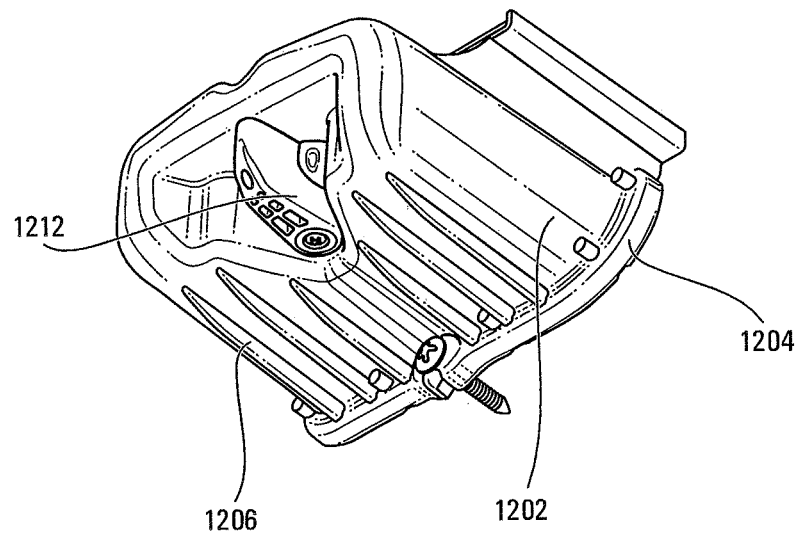
Figure 4C:
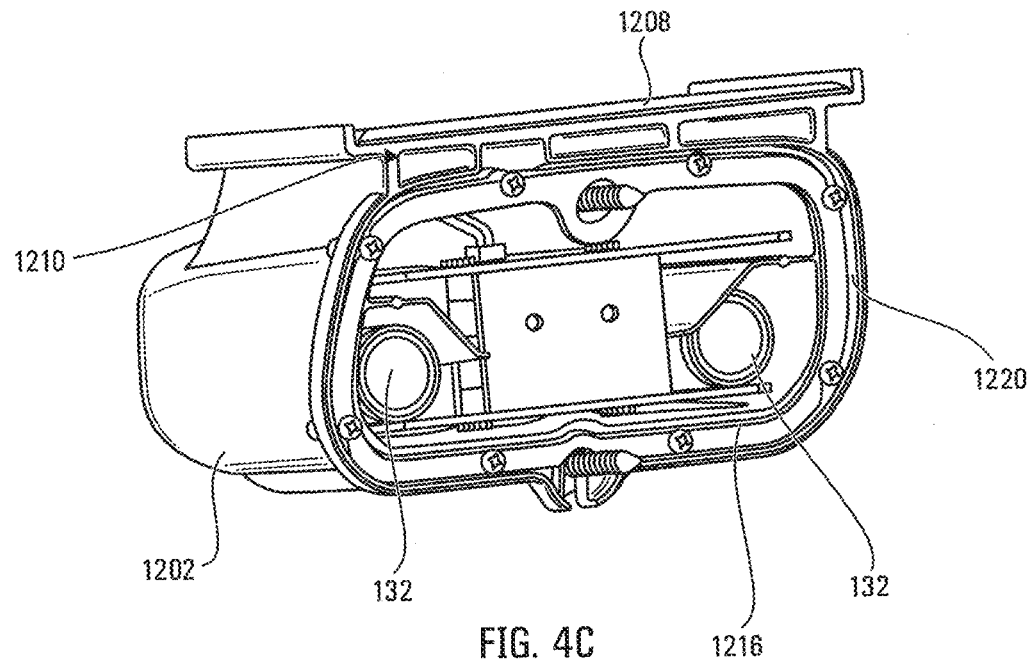
Figure 4D:
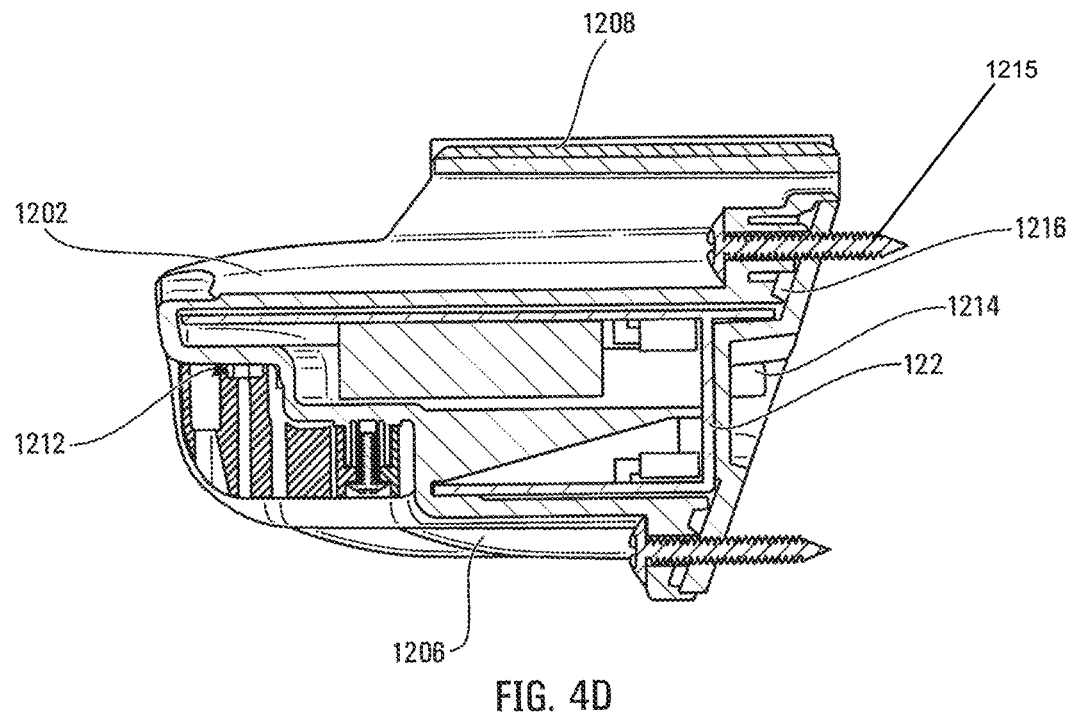

As shown, the monitoring device 104 is mounted to a portion of hull 200 that is disposed beneath the surface of the water. Monitoring device 104 has a housing 120, which may be rigidly attached to hull 200 using suitable adhesives or fasteners 1215 (FIG. 4D). Housing 120 may be formed of a metallic or polymeric material, or combination thereof.

Housing 120 may be sealed against water ingress. Joints between walls of housing 120 may be sealed, e.g. with a water-resistant coating. Housing 120 may be configured such that no seal is necessary between housing 120 and hull 200. For example, housing 120 may be configured such that a wall abuts hull 200 and is solid, with no joints in the wall.

Notably, monitoring device 104 is capable of measuring the effect of pressure variations without directly contacting the medium through which such pressure variations are transmitted, i.e. the water. No component of monitoring device 104 is exposed to the water. Accordingly, monitoring device 104 may have very little adverse impact on the marine environment in which it is used.

An electronic interconnect such as a circuit board 122 may be positioned within housing 120. One or more functional units may be interconnected to circuit board 122.

Figure 3:
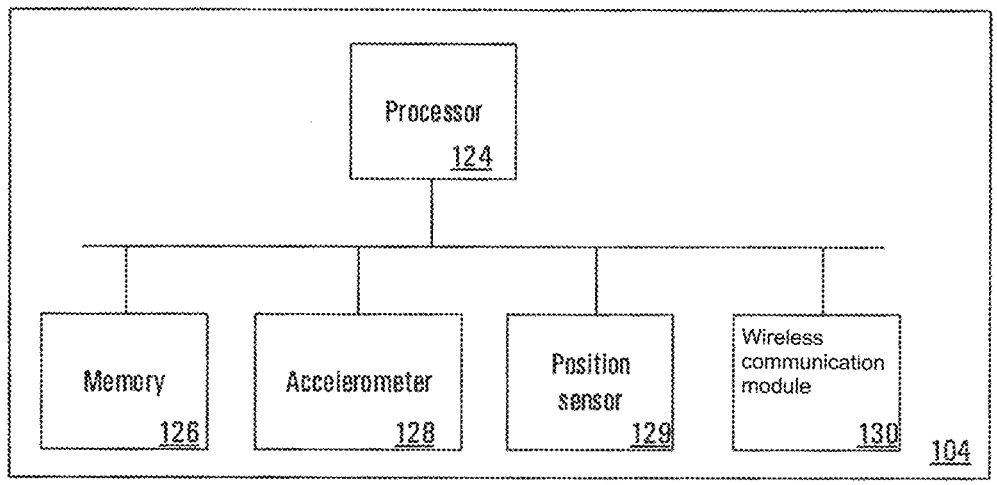
FIG. 3 is a block diagram showing components of the monitoring device of FIG. 2.

Example functional units are depicted in FIG. 3. As shown, the functional units include a processor 124, a memory 126, a blast sensor such as an accelerometer 128 for detecting the effects of a shockwave, a position sensor 129 and one or more wireless communication modules 130.

In the depicted embodiment, processor 124 is a microcontroller. Memory 126 may also be integrated in the microcontroller, or may be in one or more discrete chips. In other embodiments, processor 124 may be any other suitable processor, such as an application-specific integrated circuit (ASIC) or a general purpose processor such as an intel or AMD x86-based processor, or an ARM-based processor, or any other suitable processor.

Accelerometer 128 is operable to measure vibration of hull 200 due to pressure variations in the water, and to provide an output indicative of such vibrations for use by processor 124. Accelerometer may be a MEMS accelerometer or other suitable type of accelerometer.

Position sensor 129 is operable to measure the spatial position of monitoring device 104. In the case of a device 104 mounted to a vessel 102, the position of device 104 may be considered as the position of the vessel 102. Position measurement may be periodic or in response to an instruction from another component of monitoring device 104. Position sensor 129 may be, for example, a receiver that operates with one or more global or regional satellite positioning systems such as a Global Positioning System (GPS), GLONASS, Galileo, BeiDou, NAVIC or QZSS. Additionally or alternatively, position measurement may use telecommunication networks such as wi-fi or cellular networks in the measurement of position. For example, position measurement may use signals from a satellite navigation system, in combination with network characteristics such as proximity to specific network access points.

Wireless communication module 130 may include at least one radio-frequency (RF) transceiver for interfacing with a network, such as the internet. Communication module 130 may interface with the network using one or more wireless technologies such as IEEE 802.11 (Wi-Fi), Bluetooth, cellular communication technologies such as GSM, GPRS, EDGE, UMTS, LTE or the like, or satellite communication technologies such as Argos, Globalstar, Iridium, Inmarsat, Starlink or OneWeb.

Functional units of monitoring device 104 may be incorporated in one or more semiconductor dies or chips 131. In some embodiments, multiple functional units may be incorporated in a single die, such as a microcontroller or a system-on-chip.

Referring again to FIG. 2, a power source may also be provided within housing 120. As depicted, the power source is a battery 132. Battery 132 may be coupled to a charger, such as a solar charger located on the exterior of housing 120. In other embodiments, monitoring device 104 may be powered by an external power supply. Conveniently, monitoring devices 104 with a battery 132 and a charger such as a solar charger may be capable of operating indefinitely or for extended periods without battery change or connection to external power. During such operating periods, monitoring devices 104 may require little or no physical human intervention.

Housing 120 may be substantially rigid and may be rigidly attached to hull 200 so that vibrations may be transmitted through hull 200 to housing 120. Likewise, accelerometer 128 may be rigidly supported by housing 120 to accurately detect the transmitted vibrations. In some examples, accelerometer 128 is positioned in close proximity to the structure, device, adhesive or the like that secures housing 120 to hull 200. In other words, accelerometer 128 may be positioned at or near the portion of housing 120 that is most rigidly attached to hull 200. Housing 120 and accelerometer 128 are preferably mounted so that monitoring device 104 can withstand large shocks and so that the accelerometer is capable of measuring acceleration with high sensitivity. In some examples, monitoring device 104 can withstand shock of 10000 g or more, and accelerometer 128 is capable of detecting acceleration with less than 0.1 g granularity.

As shown in FIG. 2, occurrence of a blast 134 in the water causes propagation of pressure waves 136 through the water. When waves 136 contact hull 200, they cause hull 200 to vibrate. Vibration of hull 200 causes movement of monitoring device 104, i.e. of housing 120 which is rigidly fixed to hull 200 and accelerometer 128. Accelerometer 128 produces an output signal representative of the vibration of hull 200 and provides the signal to processor 124.

Processor 124 is configured to analyze the signal received from accelerometer 128 and to produce an output if the signal meets criteria determined to be indicative of a blast.

FIGS. 4A-4D show the physical configuration of monitoring device 104 in greater detail. In the depicted embodiment, housing 120 is formed of a polymeric material. Housing 120 defines a shell 1202, with a mounting flange 1204 and one or more reinforcing or cooling ribs 1206.

The depicted monitoring device 104 includes a solar panel 1208 for charging battery 132 to power monitoring device 104. Solar panel 1208 is mounted on a platform that projects from shell 1202.

Overheating can interfere with operation of monitoring device 104. For example, battery 132 may not charge above a threshold temperature and processing components may cease to function or may be damaged above a threshold temperature.

Solar panel 1208 provides some shade to housing shell 1202 and therefore provides some protection against overheating. However, under normal operating conditions, solar panel 1208 may achieve a temperature higher than acceptable for battery 132. Ventilation passages 1210 are provided between solar panel 1208 and housing shell 1202 to provide thermal isolation between solar panel 1208 and shell 1202 and to provide additional cooling of shell 1202 and its contents.

A mode switch 1212 may be provided, and may be accessible from the exterior of monitoring device 104. Mode switch 1212 may be a contactless switch, that is, a switch which does not physically contact the components inside shell 1202.

Mode switch 1212 allows a user to select an alternate operating state of monitoring device 104. In a first alternate state, monitoring device 104 may transmit an emergency signal for reception by nearby vessels or monitoring devices. In a second alternate state, monitoring device may act as a network access point (e.g. a wi-fi hotspot) to provide network connectivity to other nearby devices.

Housing 120 has a rear cover 1214, which can be attached to shell 1202 to define a water-tight seal. A sealing member, e.g., gasket 1216, may be interposed between rear cover 1214 and shell 1202, as shown in FIG. 4D.

Flange 1204 has an outer contact edge 1220 which extends beyond rear cover 1214 and gasket 1216 and, when monitoring device 104 is installed to hull 200, contacts the hull. Accelerometer 128 is in turn rigidly mounted to housing 120. For example, accelerometer 128 may be located on circuit board 122, which may be rigidly mounted to housing 120.

Conveniently, this mounting and sealing configuration provides for effective transmission of vibrations from hull 200 to accelerometer 128. For example, gasket 1216 does not form part of the path through which accelerometer 128 receives vibrations. Rather, vibrations are transmitted directly from hull 200 to housing 120 by contact with edge 1220.

Figure 5:
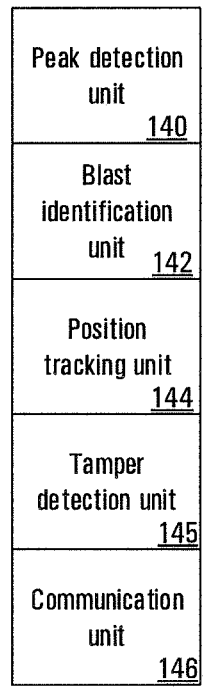
FIG. 5 is a block diagram showing processing units of the monitoring device of FIG. 2.

FIG. 5 shows processing components at monitoring device 104. In the depicted embodiment, the processing components are implemented in software. That is, each component comprises a series of computer-readable instructions stored at monitoring device for execution by processor 124. Alternatively or additionally, some or all of the processing components may be implemented in hardware, or in firmware.

As depicted, the processing components include a peak detection unit 140, a blast identification unit 142, a position tracking unit 144 and a communication unit 146. In some embodiments, the processing components may further include a tamper detection unit 145.

Figure 6:
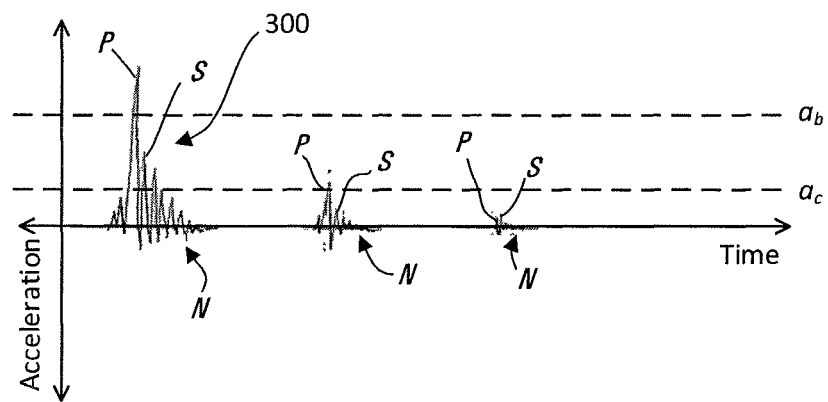
FIG. 6 is a plot of a signal from an accelerometer of the monitoring device of FIG. 2, in response to a blast event.

FIG. 6 is a graphical representation of an acceleration signal 300 from accelerometer 128. Acceleration signal 300 is characterized by a series of peaks and valleys of varying magnitude. Some peaks and valleys of signal 300 are caused by deflection of hull 200 in response to a shock wave in the water. Other peaks and valleys may be due to noise such as electronic noise in accelerometer 128, or due to extraneous small ambient or environmental vibrations. In the depicted example, peaks labelled P are associated with pressure pulses from a blast event. Peaks labelled S are secondary pulses, such as reflections, and N denotes regions of noise.

Peaks and valleys above a defined threshold value may be considered as likely to be associated with a blast event. Peak detection unit 140 is configured to periodically or continuously monitor for acceleration signal above such a threshold, shown in FIG. 6 as $a_b$. Peak detection unit 140 monitors the absolute value of the acceleration signal. That is, the threshold $a_b$ is a threshold magnitude of acceleration, regardless of direction. Typical threshold values may range between 0.1 g and 0.15 g. Upon the acceleration signal reaching the threshold value $a_b$, peak detection unit 140 may provide an instruction to activate blast identification unit 142.

Blast identification unit 142 is configured to analyze the acceleration signal 300 to discriminate for indicia of a blast event. The pattern produced by a blast event may have characteristic features. For example, the initial peak may have a magnitude within a typical range, associated with the types of devices and resultant blast magnitude typically seen in blast fishing. Moreover, the rate at which the hull 200 deflects may likewise be influenced by the strength of the shock wave (and thus, the size and type of explosive device used to produce the blast), as well as the properties of the hull 200. This may produce an acceleration signal with a characteristic shape. The shape may be approximated, for example, by measuring the slope of the acceleration curve, or by measuring the duration of time for which the signal stays above a threshold value. Subsequent peaks typically progressively decay and generally occur at a frequency within a specific range. Typically, the first peak pulse produced by a blast event lasts no longer than 35 ms. That is, the acceleration signal associated with the first peak is typically above threshold $a_b$ for no more than 35 ms. The second peak typically occurs at least 70 ms after the first peak, and a third peak typically occurs at least 160 ms after the first peak. Depending on depth and distance from the blast, the peak associated with the first blast event typically reaches a maximum magnitude of 15 g to 35 g. The second peak typically reaches a maximum magnitude of 7 g to 11 g and the third peak typically reaches a maximum magnitude of 2 g to 3 g.

Blast identification unit 142 is therefore configured to measure the maximum value measured during each acceleration peak, the slope of the acceleration curve and amount of time the acceleration value is above threshold $a_b$, the latency between successive peaks, and the number of peaks above a second threshold value $a_c$. As depicted, the second threshold value $a_c$ is lower than the initial peak detection threshold value $a_b$. However, in some embodiments, the values of $a_b$ and $a_c$ may be the same.

Blast identification unit 142 is configured to determine, based on the above parameters, whether a measured acceleration signal is indicative of a blast event. In an example, the signal is determined to be indicative of a blast if each parameter falls within a defined range. Additionally or alternatively, the determination may be based on a combination of parameters, e.g. a weighted combination.

Blast identification unit 142 is further configured to provide an output signal upon determining that signal 300 is indicative of a blast event. The output signal may include an indication that a possible blast event has been detected, a timestamp identifying the time of the event, and characteristics of the detected signal, such as a maximum peak measurement.

Analysis of acceleration signal 300 using blast identification unit 142 is more computationally demanding than peak monitoring using peak detection unit 140. Accordingly, peak detection unit 140 may execute continuously or periodically at high frequency, and blast identification unit 142 may be dormant except when activated in response to a trigger from peak detection unit 140. This configuration may limit power consumption. In battery-powered embodiments, such intermittent operation of blast identification unit 142 may allow for improved battery life, as opposed to continuous operation of blast identification unit 142.

Position tracking unit 144 is configured to periodically poll position sensor 129 for a location measurement. Alternatively or additionally, position tracking unit 144 may be activated by blast identification unit 142 upon detection of a blast event, and may poll position sensor 129 in response to activation. As will be apparent, this may reduce polling frequency and power consumption, which may increase battery life. Upon receipt of a location measurement from position sensor 129, position tracking unit 144 may provide an output message to communication unit 146 representative of the location measurement.

Figure 7:
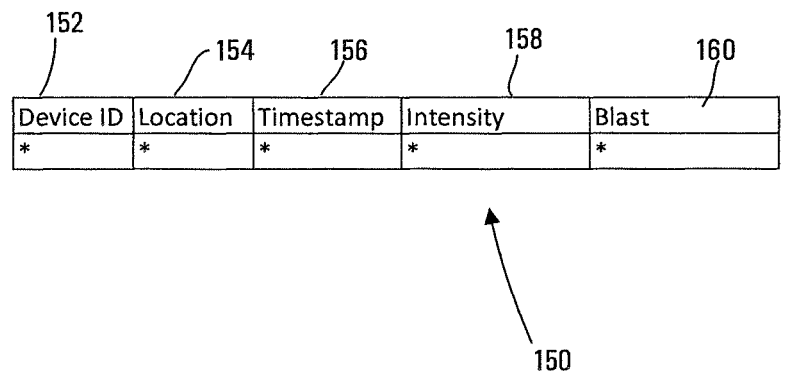
FIG. 7 shows an example blast alarm message sent by the monitoring device of FIG. 2.

Communication unit 146 is configured to receive the output messages from blast identification unit 142 and position tracking unit 144 and to send a blast alarm message to monitoring station 112 by way of network 116. The blast alarm message may contain some or all of the data output by blast identification unit 142 and position tracking unit 144. FIG. 7 depicts an example blast alarm message 150 in tabular form. As shown, blast alarm message 150 includes a blast alarm field 160, which may be a binary value set to 1 or "TRUE" in the event a blast is detected. Blast alarm message 150 further includes a device ID field 152 containing a unique identifier of the monitoring device 104, a timestamp field 156, and an intensity field 158 containing the maximum peak value of signal 300. Blast alarm message 150 further includes a location field 154 containing the most recent location measurement from position sensor 129. The location measurement is taken as the location of the blast event.

Communication unit 146 may be further configured to provide status messages to monitoring station 112. Status messages may be provided periodically or in response to requests from monitoring station 112. In some embodiments, status messages may, be identical to blast alarm messages 150, except that the blast field 160 may be set to 0 (zero) or "FALSE", indicating that the message does not reflect detection of a blast event. In other embodiments, status messages may contain more or less information. For example, status messages may include logs of recent readings above threshold $a_b$ (FIG. 5) and associated time stamps.

Tamper detection unit 145 is configured to monitor status information of monitoring device 104 and to detect and respond to conditions indicative of tampering.

For example, tamper detection unit 145 may monitor the signal produced by accelerometer 128. Based on readings from accelerometer 128, tamper detection unit 145 may determine the orientation of monitoring device 104. Based on the orientation, tamper detection unit 145 may determine if monitoring device 104 is correctly installed to hull 200. If not, tamper detection unit 145 may instruct communication unit 146 to send a tamper condition signal, i.e. a message indicating a likelihood that monitoring device 104 has been improperly tampered with. Signals from accelerometer 128 may also identify dropping of device 104 or removal of device 104 from hull 200.

Tamper detection unit 145 may also continuously monitor the power source for monitoring device 104, namely, solar panel 1208 and battery 132. Specifically, a decrease in output from solar panel 1208, e.g. a decrease in amperage or voltage, may indicate that solar energy is being blocked from the solar panel 1208. Such blockage for example, result from a user intentionally covering solar panel 1208, or from solar panel 1208 becoming partially covered by dirt, salt or the like. Interruption of power flowing to or from battery 132 may result from removal of the battery.

Tamper detection unit 145 may further monitor communication status with monitoring station 112. Interruption of communications may for example indicate blocking or removal of the network connection.

Tamper detection unit 145 may further monitor communication signals between components such as processor 124 and accelerometer 128. Breaking of such communications may be indicative of disassembly of monitoring device 104.

Tamper detection unit 145 may further include magnetic sensors, such as inductive sensors. Such sensors may be positioned to detect the presence or position of fasteners securing monitoring device 104 to hull 200 and to detect the state (position) of switch 1212. In the event that a fastener is missing or the switch is in an incorrect position, tamper detection unit 145 may instruct communication unit 146 to send a tamper condition signal.

Tamper detection unit 145 may further take into account position signals produced by position tracking unit 144. If the position is remote from a location in which a vessel is expected to be operated, tamper detection unit 145 is configured to instruct communication unit 146 to send a tamper condition signal. Such a location signal could also be consistent with theft of a vessel, and could be used to aid in recovery of the vessel.

Tamper detection unit 145 may further be capable of monitoring temperature within housing 120. Temperature monitoring may enable tamper detection unit 145 to verify correct operation of monitoring device 104 Temperature monitoring may enable tamper detection unit 145 to verify correct operation of monitoring device 104 and to detect intentional damage to unit, e.g. by heating in fire or the like.

Components of monitoring device 104 may be physically secured within housing 120. For example, components may be installed using locking devices or adhesives to prevent removal. Data storage devices may be permanently secured in this manner to prevent unauthorized modifications, e.g. modifications to device firmware or the like. Housing 120 may also include insignia designed to break in the event of opening. Thus, intact insignia may confirm that device 104 has not been physically modified.

Conveniently, monitoring device 104 uses relatively little power and can operate for an extended period on power from battery 132. While operating, monitoring device 104 may frequently send transmissions to monitoring station 112. Accordingly, monitoring station 112 may also perform tamper detection functions, as interruption of messages from monitoring device 104 may indicate that the monitoring device 104 has been disabled.

Figure 8:
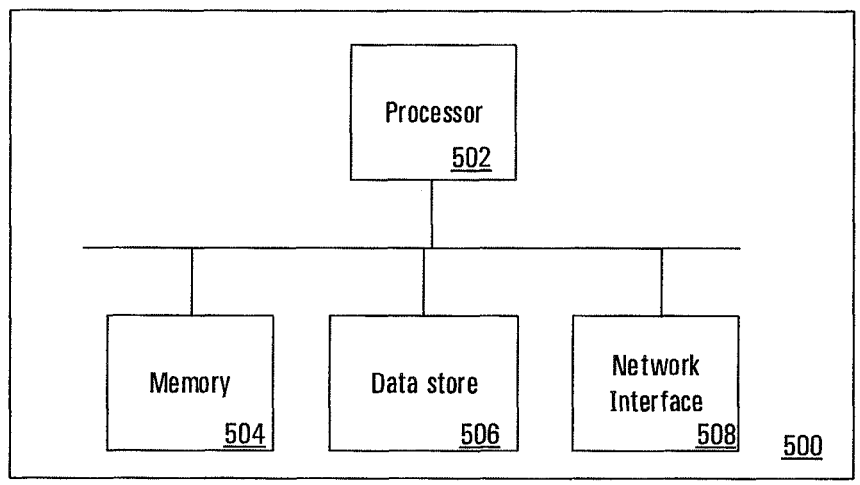
FIG. 8 is a block diagram showing components of a computing device at a monitoring station of the system of FIG. 1.

FIG. 8 depicts components of an example computing device 500 at monitoring station 112. As shown, computing device 500 includes a processor 502, a memory 504, data store 506, and network interface 508.

The processor 502 may be an intel or AMD x86-based processor, or an ARM-based processor, or any other suitable processor.

Network interface 508 may be any suitable wired or wireless device connecting computing device 500 to network 116 for communication with monitoring devices 104. Network interface 508 may be, for example, an Ethernet or IEEE 802.11 (Wi-Fi) network adapter.

Computing device 500 may maintain a monitoring database at data store 506. The monitoring database may include, current status information for each monitoring device 104 based on received status messages. For example, the database may include a location and associated time stamp for each monitoring device 104. Optionally, the database may further include historical location data or blast status data for each monitoring device 104, descriptive of vibration signals received by the particular monitoring device 104. Historical data may include, for example, the location, time, and intensity of any blasts previously detected by a particular monitoring device 104.

Figure 9:
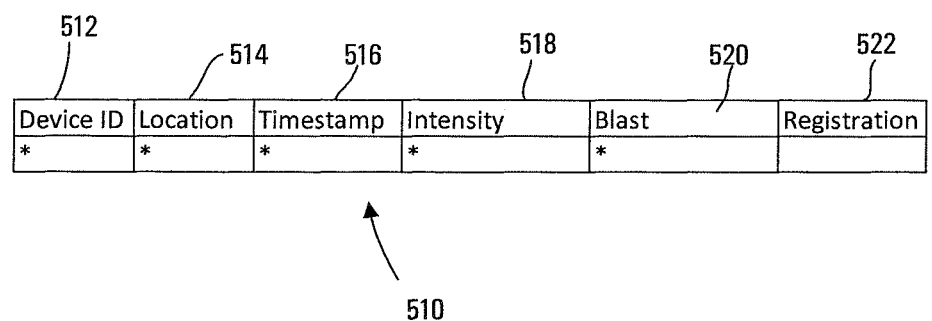
FIG. 9 is a schematic diagram showing a data structure at the computing device of FIG. 8.

FIG. 9 depicts an example table 510 stored at data store 506. As shown, table 510 includes a Device ID column 512, a location column 514, a timestamp column 516, an intensity column 518, a blast column 520 and a registration column 522.

Each row of the device ID column 512 includes a value uniquely identifying a monitoring device 104. Location column 514 and timestamp column 516 respectively contain the most recent position measurement and time of that measurement for each device 104. Intensity column 518 contains a characterization of the maximum vibration intensity observed at each device 104. In an example, the intensity column 518 may contain the peak reading at the device 104 within a given period preceding a status message. For example, the intensity may reflect the highest reading at the device within the one minute preceding the timestamp stored in column 516. Blast column 520 contains a value indicating whether a blast event has been detected by a monitoring device 104. The blast value may be Boolean, i.e. "true" or "false". Additionally or alternatively, blast column 520 may contain a value indicating the likelihood that a blast event has been detected. Registration column 522 contains information for identifying an individual, vessel or object associated with a given monitoring device 104. The registration information may be a name, or a unique token which corresponds to a name in another enforcement database. Thus, for example, table 510 may allow for individual tracking of units 104, but may be configured in such a way that table 510 itself does not provide sufficient information to identify the individual or vessel to which a given set of measurements corresponds. In other embodiments, more or fewer columns may be present in table 510.

Figure 10:
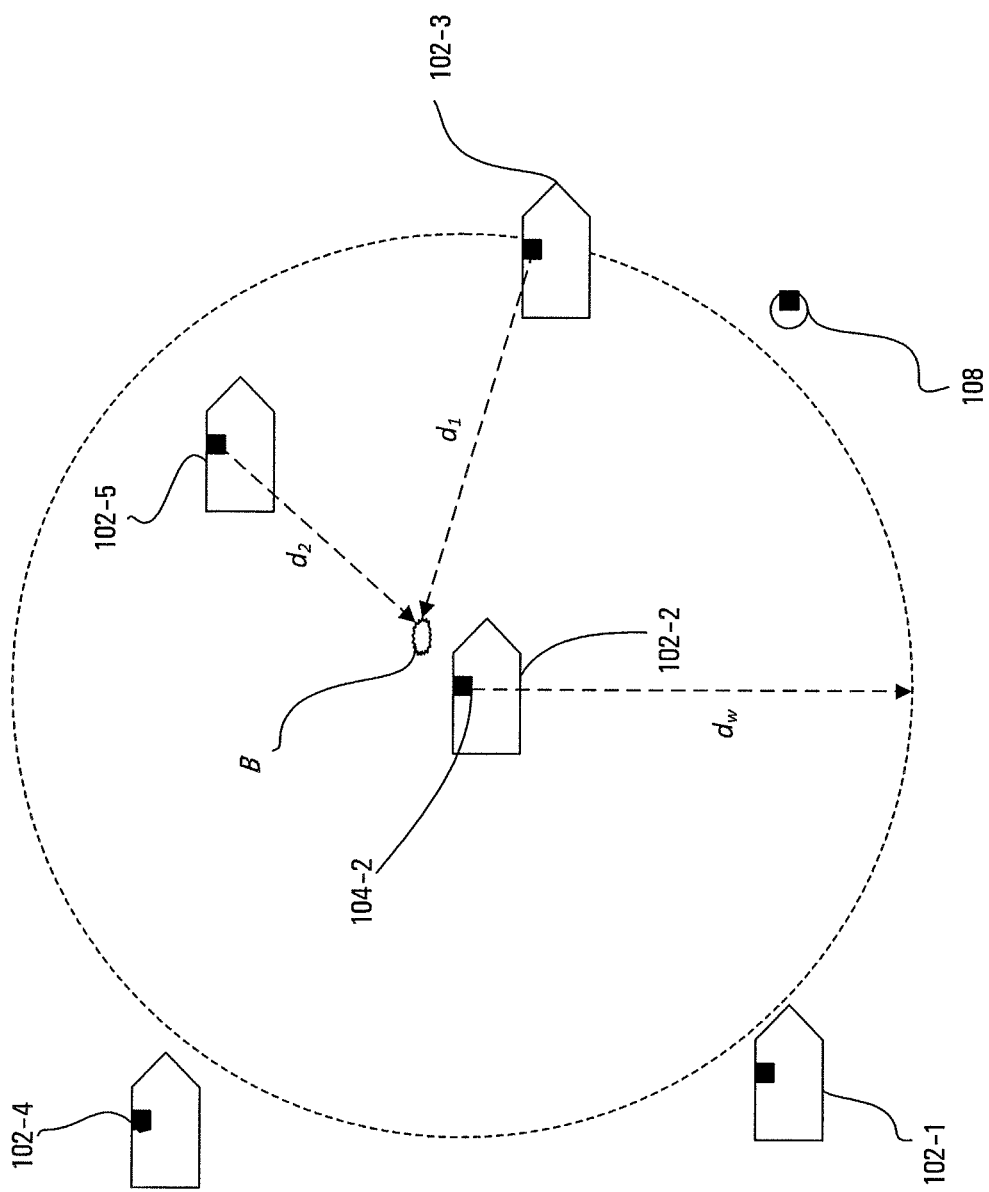
FIG. 10 is a schematic view showing monitoring of a blast event by a plurality of monitoring devices.
Figure 11:
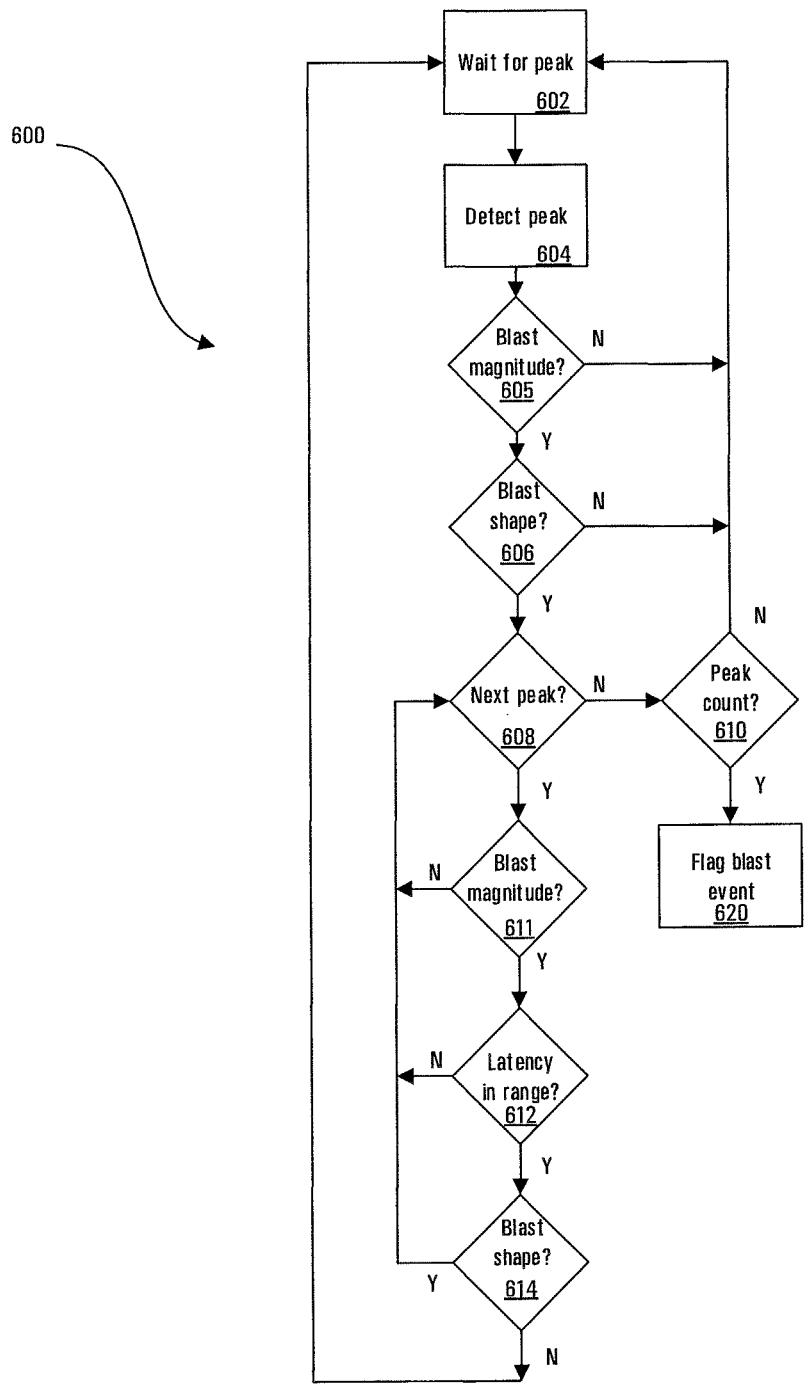
FIG. 11 is a flow diagram showing operation of the monitoring device of FIG. 2.
Figure 12:
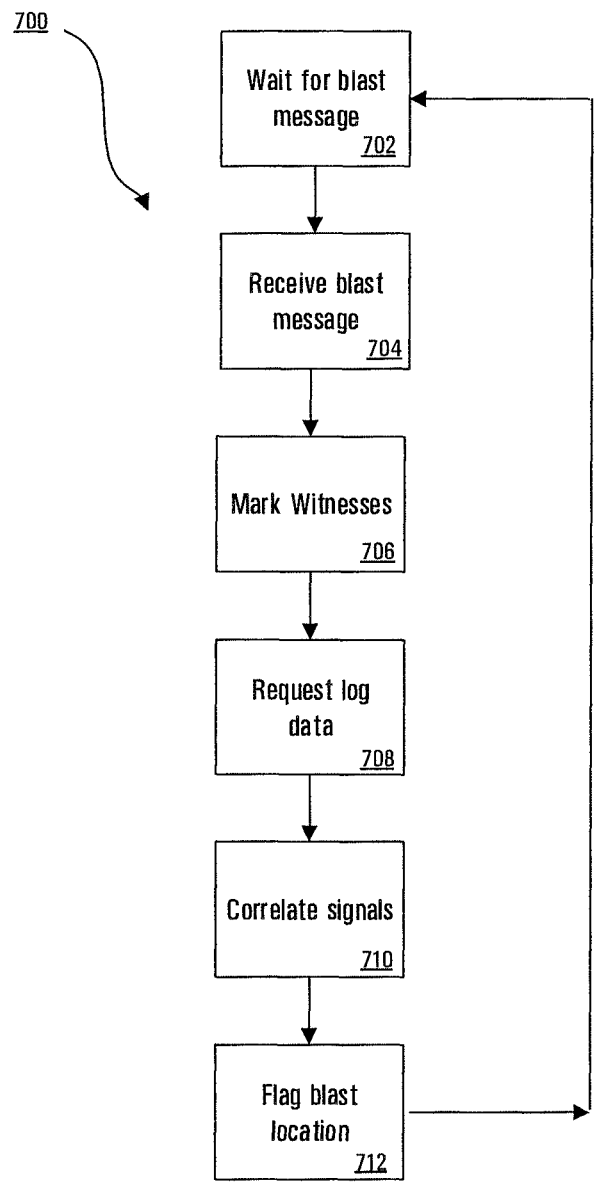
FIG. 12 is a flow diagram showing operation of a monitoring station of the system of FIG. 1.

FIGS. 10-12 depict an example blast event among a fleet of vessels and an example operating processes 600, 700 of monitoring device 104 and monitoring station 112.

FIG. 10 shows an enlarged view of a series of vessels 102 in a fishing area. As depicted, a blast event B occurs at vessel 102-2, to which monitoring device 104-2 is mounted. Blast event B creates a shockwave within the water. The shockwave propagates in all directions away from the site of the blast event B. The strength of the shockwave deteriorates as it travels through the water. Therefore, the strength with which the shockwave impacts any one of vessels 102 depends on the distance between blast event B and the specific vessel 102.

Thus, in the depicted example, the shock wave is felt very strongly at vessel 102-2, since the shock B is immediately adjacent to vessel 102-2. Vessels 102-3, 102-5 are located near blast event B, at distances of $d_1$, $d_2$, respectively, and likewise feel the shock wave relatively strongly.

FIG. 11 depicts an example process 600 of operation of monitoring device 104.

At block 602, peak detection unit 140 awaits detection of a signal peak above threshold $a_b$ (FIG. 5). Blast identification unit 142 is idle. Peak detection unit 140 may constantly monitor the signal from accelerometer 128. Alternatively, peak detection unit 140 may periodically sample the signal from accelerometer 128.

At block 604, the signal from accelerometer 128 exceeds threshold $a_b$, Blast identification unit 142 is triggered and analysis of the signal begins to determine whether the signal matches characteristics associated with a blast event.

At block 605, blast identification unit 142 measures the peak value of signal 300. If the peak value lies within a range associated with blast events, signal analysis continues. If not, blast identification unit 142 determines that the signal is not associated with a blast event and returns to a dormant state at block 602.

At block 606, blast identification unit 142 measures shape characteristics of the signal from accelerometer 128 to determine if the signal corresponds to the shape expected to result from a blast. The shape characteristics may include the slope of the signal, the duration of time the signal is above a threshold value, or both. The measured slope or duration are compared to defined ranges determined to be consistent with a blast event. The shape characteristics may be influenced by factors such as the size, shape and construction of the hull to which monitoring device 104 is mounted, and the type of mount (e.g. the rigidity of the mount).

If the shape characteristics fall within the defined range, the signal pattern is a candidate for being associated with a blast event and analysis of the signal continues. If the shape characteristics are outside the defined range, the blast identification unit 142 determines that the signal is not associated with a blast and returns to an idle state at block 602.

At block 608, blast identification unit 142 continues to monitor the signal from accelerometer 128 for subsequent peaks. Subsequent peaks are identified by the signal passing a threshold value $a_c$, which may be lower than the peak detection threshold $a_b$ applied at block 604. Monitoring at block 608 may time out after a defined maximum duration. In an example, the defined maximum duration is 400 ms. If monitoring times out without detection of a peak, analysis proceeds to block 610.

If a peak is detected during the monitoring time at block 608, blast identification unit 142 determines that a possible peak has been detected and proceeds to block 611. A counter is incremented to track the number of peaks detected.

At block 611, blast identification unit 142 determines the maximum value of the peak. The maximum value may be compared to the maximum value of the preceding peak to determine if the ratio between peaks is consistent with a blast event. If not, blast identification unit 142 determines that the signal is not associated with a blast event and returns to an idle state at block 602.

At block 612, a time elapsed between adjacent peaks (hereinafter referred to as "latency") is measured and recorded. The latency is compared to a range of values expected for a blast event, e.g. 35 ms to 160 ms. If the latency falls within the range, blast identification unit 142 continues signal processing. If not, the blast identification unit 142 determines that the signal is not associated with a blast and returns to an idle state at block 602.

At block 614, blast identification unit 142 measures shape characteristics of the subsequent peak portion of the signal. In some embodiments, the shape characteristics measured at block 614 are the same as those measured at block 606, e.g. slope and duration of time above a threshold value. Parameters for some shape characteristics may be the same at block 606 and block 614. For example, the slope of a subsequent peak may be expected to be in the same range as the slope of the initial peak. Parameters for other characteristics may differ. For example, successive peaks may generally decay in magnitude. The duration for which the signal is above a threshold value may therefore be shorter.

If at block 614, a peak is determined to have shape characteristics consistent with a blast event, blast identification unit 142 returns to block 608 and continues monitoring for further peaks. If not, the blast identification unit 142 determines that the signal is not associated with a blast and returns to an idle state at block 602.

As noted, monitoring at block 608 may be limited to a maximum duration. If the duration expires without detection of a new peak, blast identification unit 142 determines at block 610 the number of peaks that were detected within a specified time. For example, blast identification 142 counts the number of peaks observed within a period of 380 ms. If the count is below a defined maximum, at block 620, blast identification unit outputs a signal indicating that a blast event has been detected. The output is provided to communication unit 146, which in turn sends a blast alarm message 150 to monitoring station 112.

FIG. 12 depicts an example process 700 at monitoring station 112.

At block 702, monitoring station 112 waits for notification of a blast event from one of monitoring devices 104. In this state, monitoring station 112 may periodically poll monitoring devices 104 for location updates. For example, monitoring station 112 may send a message to each of monitoring devices 104, which may prompt the monitoring devices to send replies containing the most recent location measurement. Records of the location measurements are maintained in table 510.

At block 704, monitoring station 112 receives a blast alarm message from one or more of monitoring devices 104. In the example depicted in FIG. 10, a blast alarm message may be received from monitoring device 104-2 at vessel 102-2. The blast alarm message contains an indication that a blast has been detected, and data descriptive of the associated signal 300. The descriptive data may include a peak measurement from accelerometer 128, signal shape information, or a confidence score indicating the likelihood that a blast in fact occurred.

At block 706, monitoring station 112 cross-references the blast alarm message with data in table 510. Specifically, monitoring station 112 compares the location in the blast alarm message to the location stored in table 510 for each monitoring device 104. Optionally, monitoring station 112 may first send messages to each of monitoring devices 104 requesting location updates.

Monitoring station 112 then identifies or flags a set of monitoring devices 104 as witnesses, based on proximity to the location provided in the blast alarm message. In an example, monitoring station 112 identifies as witnesses all those monitoring devices 104 which are determined to be within a threshold distance of blast event B. Because the precise location of blast event B may not be known, the location of the monitoring device 104 from which the blast alarm message is received may be used as a proxy. In other words, monitoring devices 104 are flagged as witnesses to indicate that the blast event may have been observable by those monitoring devices. As depicted in FIG. 10, the threshold distance is $d_w$. The distances $d_1$ and $d_2$, between monitoring devices 104-3 and 104-4, 104-5, respectively, are less than $d_w$. Therefore, monitoring devices 104-3 and 104-5 are identified as witnesses. However, distance $d_3$, between monitoring devices 104-3 and 104-1 is greater than $d_w$. Therefore, monitoring device 104-1 is not identified as a witness. In some embodiments, the threshold distance corresponds to the maximum blast detection range of monitoring devices 104. In a typical installation, the maximum blast detection range may be about 120 m.

Alternatively, the threshold distance may correspond to an approximate visible distance. That is, devices within visual range of the blast event may be flagged as witnesses. In some embodiments, multiple groups of witnesses may be flagged. For example, a first group may correspond to those vessels within the blast detection range of monitoring devices 104, and a second group may correspond to those vessels within visual range of the blast.

Optionally, at block 708 monitoring station 112 may request the monitoring devices 104 identified as witnesses to provide log messages containing data describing recent signal measurements. For example, the log messages may include the peak reading from accelerometer 128 within a specific time range before or after blast event B. Additionally or alternatively, the log messages from a given monitoring device 104 may contain one or more of: time stamps, shape characteristics of the signal received at each monitoring device 104, and the raw signal from accelerometer 128.

If log messages are received, at block 710, monitoring station 112 may process data from the blast alarm message and the log messages. For example, the maximum signal magnitude from each monitoring device 104, and the locations of the monitoring devices 104 may be used to approximate the location of blast event B. Estimating the location of blast event B in this manner may validate the received blast event alarm.

At block 712, monitoring station 112 flags the location of blast event B and vessel 102-2 from which the blast alarm message was received. A message may be sent to a system, such as a computer system of a third-party regulatory authority. The message may identify the flagged location and vessel, as well as any vessels or objects to which the witness monitoring devices 104 are mounted. The message may further include data regarding the blast event, such as a measured intensity, and any data reported by witness monitoring devices 104 that validate the data in the blast alarm message. The regulatory authority may use the provided data to aid in enforcement action.

Processes 600, 700 may occur without intervention by any human operator. In particular, in some embodiments, monitoring device 104 may be mounted within vessel 102 in such a way as to prevent attempts to control or disable the device, e.g. by an operator of the vessel 102.

As described above, monitoring devices 104 measure effects of blast events transmitted through water, i.e. pressure waves. In other embodiments, monitoring devices 104 may be used to monitor events through other fluid media, such as liquid media. For example, monitoring devices 104 may be used to detect blast events in oils or other liquids.

As described above, monitoring devices 104 measure the effects of blast events by using an accelerometer to detect motion (e.g. deflection) of hull 200. In other embodiments, the accelerometer may be replaced by another type of sensor. For example, pressure variations in the water adjacent hull 200 could be measured directly using a pressure transducer such as a piezo or a membrane pressure sensor.

As described above, analysis of signal 300 by monitoring device 104 involves obtaining a series of measurements of signal 300 and testing each measurement against a defined range, such that the signal is disqualified as being associated with a blast event if any of the measurements do not fall within the range. Other techniques are possible. For example, each measurement could be compared against a range and a score could be assigned based on its deviation from that range. The scores could be combined to generate an aggregate score reflecting the likelihood that the signal 300 was caused by a blast event. In some embodiments, the combination may be weighted.

Systems and methods herein may be used with fleets of any number of vessels 102. The blast detection capability is not fixed to any particular location or fishery, because the monitoring devices 104 move with vessels 102. Moreover, the service range of monitoring station 112 may be limited only by the geographical extent of network 116 (FIG. 1). In embodiments in which network 116 comprises the internet, the geographical range may be substantially unlimited. Thus, the activities of vessels 102 may be monitored regardless of whether vessels 102 operate in a specific fishing area. In contrast, fixed emplacements such as conventional seismic monitoring stations can only observe a specific fixed area.

The above examples are intended to be illustrative and should not be interpreted as limiting. Modifications are possible, as will be apparent to skilled persons in view of the disclosure. The invention is defined by the claims, which should be interpreted broadly in view of the specification as a whole.

What is claimed is:

1. A device for monitoring fishing vessel activity, comprising:
   a blast sensor mountable to an internal surface of a hull of a vessel for providing a signal responsive to pressure waves in a liquid;
   a position sensor for measuring a position of the vessel;
   a processor operable to detect a blast event based on a characteristic of a signal from said blast sensor; and
   a wireless communication module to wirelessly transmit status information including a unique identifier of a monitoring unit and indicative of the position of the monitoring unit and to send a wireless signal in response to said detected blast event.

2. The device of claim 1 wherein said blast sensor comprises an accelerometer.

3. The device of claim 1, wherein said position sensor is a receiver that operates with a satellite positioning system.

4. The device of claim 1, wherein said processor is operable to detect said blast event based on a shape characteristic of said signal from said blast sensor.

5. The device of claim 4, wherein said shape characteristic includes a slope of said signal.

6. The device of claim 4, wherein said shape characteristic includes a duration of time said signal is above a threshold value.

7. The device of claim 4, wherein said monitoring unit is configured to count a number of peaks in said signal from said blast sensor.

8. The device of claim 1, wherein said device comprises a housing mountable to said vessel with a surface abutting the hull of said vessel, and a seal structure defining a watertight seal around said surface, wherein said housing comprises an edge that directly contacts said hull without said watertight seal interposed between said housing edge and said hull.

9. The device of claim 8, comprising a tamper detection unit in said housing.

10. The device of claim 9, wherein said tamper detection unit is configured to send a signal indicative of tampering based on a measurement from said blast sensor.

11. The device of claim 9, wherein said tamper detection unit is configured to send a signal indicative of tampering based on inductive monitoring of a fastener coupling said device to said hull.

12. The device of claim 9, wherein said tamper detection unit is configured to send a signal indicative of tampering based on monitoring of a power source.

13. A system for monitoring fishing vessel activity, comprising:
   a plurality of devices as recited in claim 1 and mounted to a corresponding one of a plurality of vessels; and
   a monitoring station, comprising:
   a network interface for receiving said status information and said wireless signal;
   a monitoring station processor configured to select a set of witnesses from among devices at the plurality of vessels, said witnesses selected based on said status information.

14. The system of claim 13, wherein said monitoring station comprises a data structure containing status information of said plurality of devices.

15. The system of claim 14, wherein said status information comprises positions for respective ones of said vessels.

16. The system of claim 14, wherein said monitoring station processor is configured to select devices at vessels within a threshold distance of said blast event as witnesses.

17. A method of monitoring fishing vessel activity, comprising, at a vessel:
   from a sensor mounted to an internal surface of a hull of the vessel, producing a sensor signal responsive to pressure waves in a liquid;
   measuring a position of the vessel using a receiver for a satellite positioning system;
   processing said sensor signal to detect a blast event based on a characteristic of said sensor signal;
   wirelessly transmitting status information to a monitoring station, said status information including a unique identifier associated with the vessel and indicative of the position of the vessel; and
   wirelessly transmitting a wireless alarm signal to said monitoring station in response to a detected blast event.

18. The method of claim 17, wherein said producing said sensor signal comprises measuring movement of the hull of the vessel with an accelerometer.

19. The method of claim 17, wherein said processing comprises counting a number of peaks in said sensor signal from said sensor.

20. The method of claim 17, comprising sending a tamper signal indicative of tampering based on a measurement from said sensor.

21. The method of claim 17 comprising sending a tamper signal indicative of tampering based on inductive monitoring of a fastener coupling said sensor to said hull of said vessel.

22. The method of claim 17, comprising sending a tamper signal indicative of tampering based on monitoring of a power source.

23. The method of claim 17, wherein said processing comprises processing said sensor signal to detect said blast event based on a shape characteristic of said sensor signal.

24. The method of claim 23, wherein said shape characteristic includes a slope of said sensor signal.

25. The method of claim 23, wherein said shape characteristic includes a duration of time said sensor signal is above a threshold value.

26. The method claim 17, comprising, at said monitoring station:
   receiving status information from monitoring devices at a plurality of vessels;
   selecting a set of witnesses from among the monitoring devices at the plurality of vessels based on said status information.

27. The method of claim 26, comprising storing said status information in a data structure at said monitoring station.

28. The method of claim 26, wherein said status information comprises positions for respective ones of said vessels.

29. The method of claim 28, wherein said selecting comprises selecting vessels within a threshold distance of said blast event.

* * * * *